UNITED STATES PATENT OFFICE.

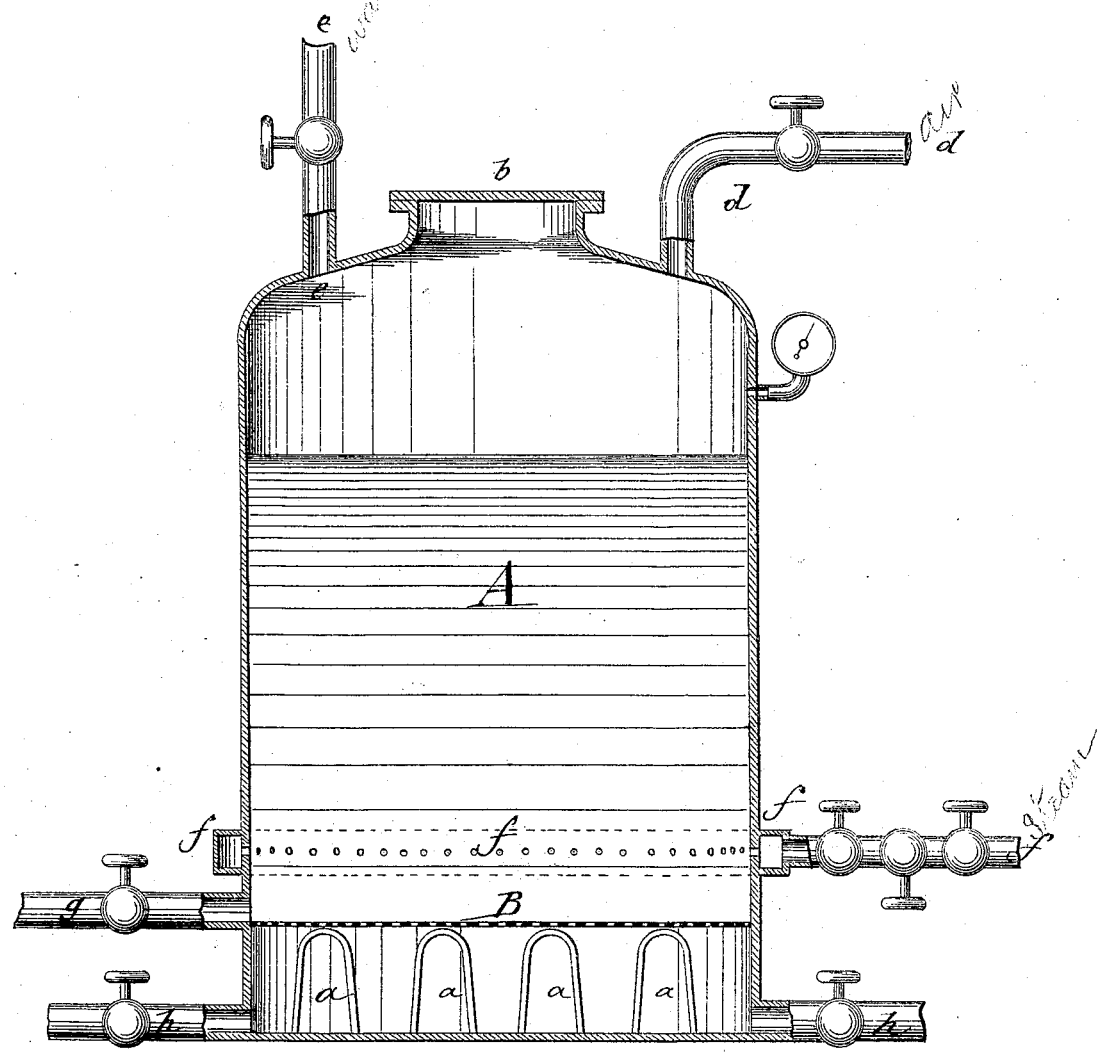

A. H. WILLIAM SCHRADER, OF HOBOKEN, NEW JERSEY.

IMPROVEMENT IN REFINING SUGAR.

Specification forming part of Letters Patent No. 152,305, dated June 23, 1874; application filed April 24, 1874.

*To all whom it may concern:*

Be it known that I, A. H. WILLIAM SCHRADER, of Hoboken, in the county of Hudson and State of New Jersey, have invented a new and Improved Process for Refining Sugar, of which the following is a specification:

The object of my improved process for refining raw sugar is mainly to facilitate and expedite the purification of the crystallized sugar from the molasses or sirup and admit the treatment of considerably larger quantities and render a higher degree of pressure than by the present methods.

Hitherto the process for separating molasses or sirup from the crystallized sugar has been performed in molds or by subjecting the same in suitable vessels or tanks to the action of steam and pressure produced by a vacuum underneath, by which the sugar is moistened and the sirup purged therefrom. The separation has also been accomplished latterly by means of centrifugal machines producing suitable pressure. None of the various processes have given entire satisfaction, partly on account of the incompleteness of the purging and draining, and partly because comparatively small quantities only could be subjected to the purifying process, and only a low degree of pressure be obtained. The separating process was thereby less expeditious and economical, and failed in many instances to give satisfactory results, especially in the inferior grades of raw sugar imported here, as dark muscovado, melado, manilla sugar, &c.

My invention consists in subjecting raw sugar when suitably moistened to the action of a very high degree of pressure acting from above on its surface, so that the compressed air percolates between the granules of the sugar and effects the bleaching and purging of the sugar previous to its dissolution. The invention consists, further, in the dissolution of the sugar in the same tank under the admission of steam and water for the purpose of repeating and completing the purification, or drawing it off for passing through the filtering and discoloring operations to be returned and purged completely, and finally dried.

In carrying out the invention, I use a tank of such size and strength that large quantities of sugar may be worked off under a pressure of forty-five pounds to the square inch, to be used in connection with an air-forcing pump, and provided with suitable pipes for admitting steam and water, and drawing off the sirup and solution. The tank is provided with a false bottom or horizontal partition and sieves capable of resisting the same degree of pressure, and perforated for the passage of the separated sirup, as shown in the accompanying drawing, in which the tank is represented in vertical central section.

In the drawing, A is the tank, constructed together with its false bottom or horizontal partition of such strength and material that a pressure of about sixty-five pounds to the square inch may be exerted thereon. The false bottom B is perforated, and provided with sieves similar to those in centrifugal machine, being placed at suitable height above the bottom of tank A, and supported and stiffened to resist the pressure by additional braces $a$. The top part or side of tank A, or both, may be provided with a man-hole, $b$, for admitting the raw sugar in large quantities into the tank, the top of the tank being connected with the air-forcing pump by a pipe, $d$, at one side. A water-pipe, $e$, of the top furnishes the necessary supply of water required in the treatment of the sugar. The tank is further provided above the perforated bottom B with steam-pipe $f$, which surrounds the tank and admits the steam preferably through a number of connecting perforations to the interior of the tank. An exit-pipe and stopcock, $g$, below the steam-pipe $f$, and immediately above the perforated bottom, admit the drawing off of the solution of sugar, while pipes $h$ near the bottom of the tank, below the perforated bottom, serve as outlet-pipes for the molasses or sirup forced into the lower chamber of the tank. The degree of pressure is indicated on a manometer placed at a suitable point of the tank.

The raw sugar is filled into the tank, according to the capacity of the same, through the man-hole and moistened, and a better quality of raw sugar, suitably moistened, placed on the top. The man-hole and pipes are then closed, with the exception of one at the bottom below the sieves, and that connected with the force-pump. The air-forcing pump is now set in operation, and the sugar exposed gradually from above to a pressure of about forty-five pounds, under which not only large quantities may be worked off in a short time, but also the resistance of the finer-grained qualities of raw sugar overcome. As this pressure is about three times that of the vacuum produced by an air-pump in the lower chamber of the tank, it is obvious that the separation of the molasses or sirup, by the action of the compressed air percolating between the granules of the sugar, is accelerated and more completely performed. The sirup passes out through one of the bottom pipes, and is collected in suitable vessels. The same tank A is now made use of for the purpose of dissolving the sugar by admitting water and steam at the same time through water-pipe $e$ and steam-pipe $f$. The solution may be drawn off or forced out for passing through the various cleaning and bleaching processes, to be exposed again to the action of the air-compressing pump, after having been boiled down to a mass of crystallized sugar and molasses, and then purged from the still adhering particles of molasses, and be completely finished by the help of a concentrated solution of white sugar.

The process of purging and draining the various imported poor or dark raw sugars is in this manner considerably expedited, and adequate means furnished for the rapid treatment of very large quantities, meeting thereby the requirements of the present state of the manufacture of sugar.

When the purging of the sugar is completed the air-forcing pump is continued in operation and dry cold or heated air forced through between the granules of the sugar, so as to percolate under the high pressure, as stated, through the layers of sugar and dry the same rapidly, carrying the evaporated moisture in similar manner as the sirup through the lowermost outlet-pipes.

Having thus described my invention, what I claim as new, and desire to secure by Letters Patent, is—

1. The process of eliminating molasses, aqueous moisture, or other liquid impurities from sugar by forcing air therethrough at a pressure of about forty-five pounds, thus purging it of molasses before and of moisture after dissolution, all as set forth.

2. An apparatus for refining sugar, consisting of vessel A $b$, provided with perforated false bottom B, annular ring of perforations surrounded by steam-tube $f$, and pipes $d\ e\ g\ h$, arranged as shown and described.

A. H. WILLIAM SCHRADER.

Witnesses:
PAUL GOEPEL,
T. B. MOSHER.